Aug. 17, 1926.

R. C. FOSTER 1,596,852

BALLOON BOAT

Filed March 25, 1924    2 Sheets-Sheet 1

Inventor
Ralph C. Foster
by Percy B. Hills
Attorney

Aug. 17, 1926.
R. C. FOSTER
1,596,852
BALLOON BOAT
Filed March 25, 1924    2 Sheets-Sheet 2
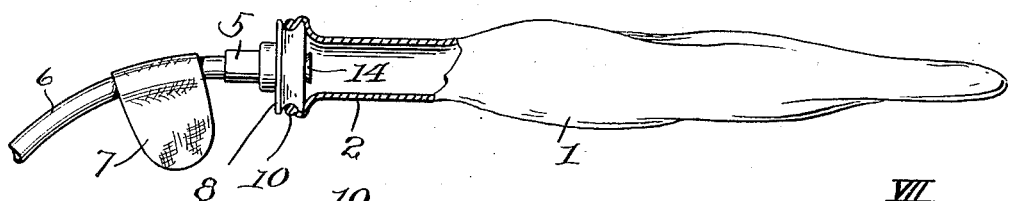
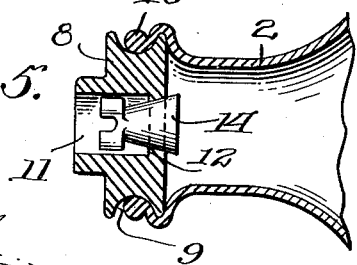
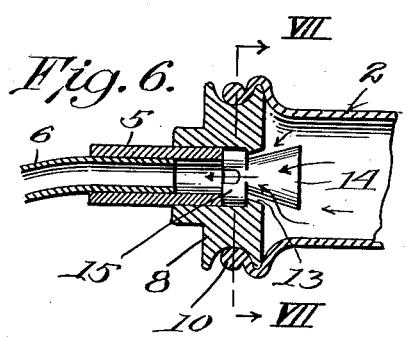
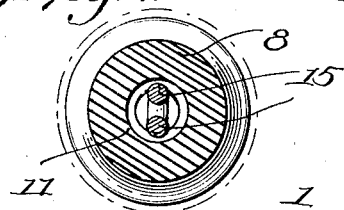
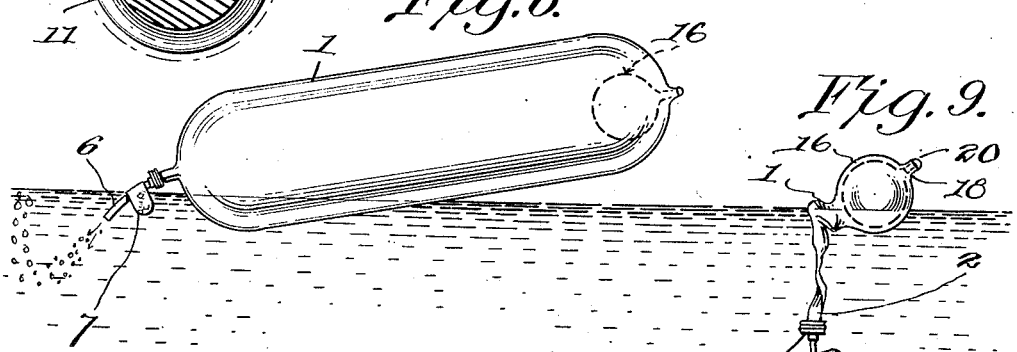
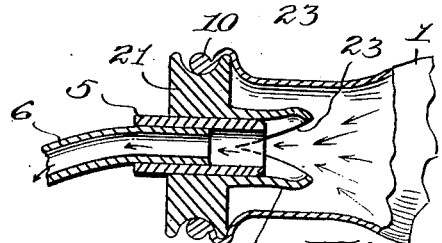
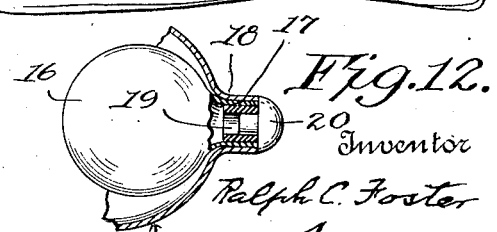
Inventor
Ralph C. Foster
By Percy B. Hills
Attorney Patented Aug. 17, 1926.

1,596,852

UNITED STATES PATENT OFFICE.

RALPH C. FOSTER, OF ASHLAND, OHIO, ASSIGNOR TO THE FAULTLESS RUBBER COMPANY, OF ASHLAND, OHIO, A CORPORATION OF OHIO.

BALLOON BOAT.

Application filed March 25, 1924. Serial No. 701,726.

My invention relates to balloon toys, and is designed to provide an inflatable rubber balloon with a tube, whereby the same, when inflated and placed on the water, will be impelled by the air escaping therefrom, said motion continuing until the air therein is discharged.

My invention also comprises certain minor noval details of construction, as hereinafter more definitely will be pointed out and claimed, reference being had to the accompanying drawings, in which:—

Figure 4 is a view similar to Figure 2 showing a modified construction.

Figure 5 is an enlarged detail sectional view of the valve of Figure 4, the same being shown closed and with the discharge tube removed.

Figure 6 is a view similar to Figure 5, showing the discharge tube inserted therein and the closing valve unseated.

Figure 7 is a transverse section taken on the line VII—VII of Figure 6.

Figure 8 is a side elevation of a balloon inflated and floating on the water, and illustrating another modified construction.

Figure 9 is a similar view showing the balloon after deflation.

Figure 10 is a view similar to Figure 2, showing still another modified construction of valve.

Figure 11 is a view similar to Figure 6, showing the valve of the construction shown in Figure 10, and with the discharge pipe inserted and the valve forced open.

Figure 12 is a detail sectional view of one end of the balloon shown in Figures 8 and 9.

Similar numerals of reference denote corresponding parts in the several views.

Figure 1:
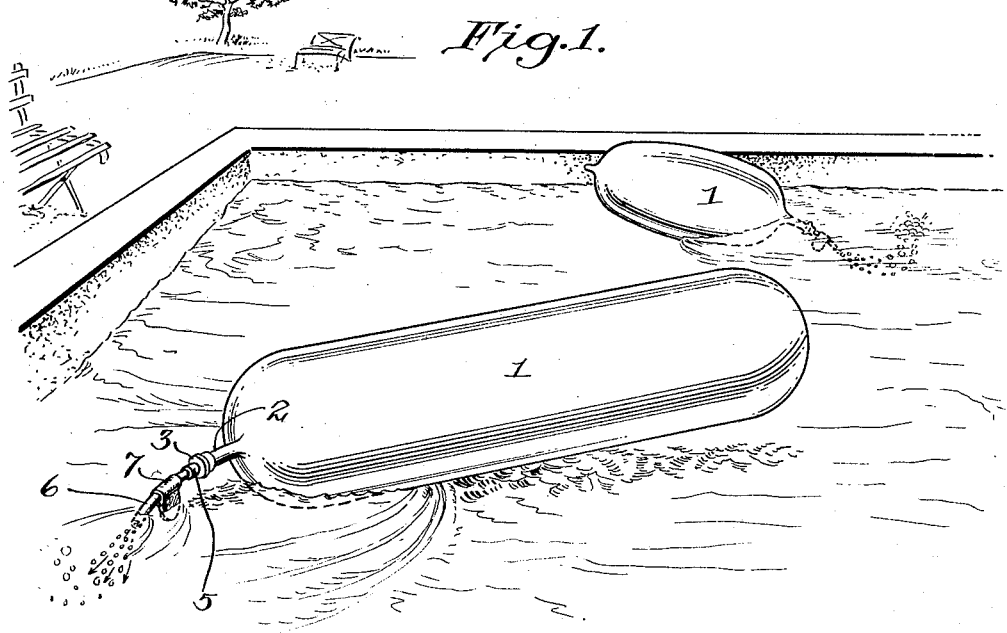
Figure 1 is a perspective view of a body of water, such as a park basin, showing two of my improved devices in action therein.
Figure 2:
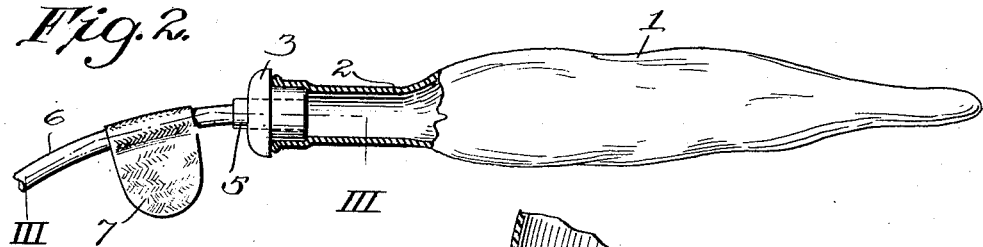
Figure 2 is a side elevation partly broken away of one form of my improved construction, the balloon being shown deflated.
Figure 3:
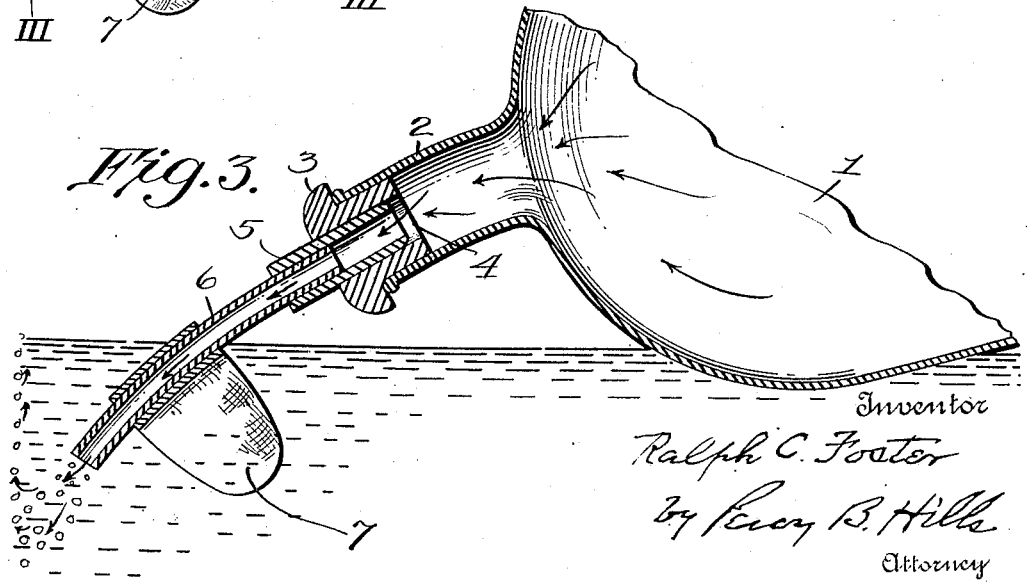
Figure 3 is an enlarged sectional view taken on the line III—III of Figure 1, the balloon being shown inflated and resting on the water, and the device in operation.

My invention in its simplest form is exemplified in Figures 1, 2 and 3, wherein the reference numeral 1 denotes an ordinary inflatable balloon formed of rubber, and having the usual neck 2. Fixed in said neck 2, by cementing or otherwise, is an apertured plug 3, which is preferably formed of semi-vulcanized rubber, though it may be formed of wood or other suitable material. The aperture 4 in said plug 3 is comparatively large, whereby the balloon readily may be inflated by blowing therein in the usual manner. After said balloon has been inflated, a collar 5, also preferably formed of semi-vulcanized rubber, and having cemented therein a comparatively small tube 6, may be inserted in the plug 3, thereby providing a discharge orifice of comparatively small area for the air in the balloon. The tube 6 preferably is curved slightly, as shown in Figures 2 and 3, and has fixed thereto, a piece of material 7, preferably rubberized fabric, which will act as a rudder. In operation, the collar 5 and tube 6 are removed from the plug 3, and the balloon then is inflated by blowing air through the opening 4 and in said plug. When fully inflated, as is the one shown in the foreground in Figure 1, the neck 2 is clamped by the fingers while the collar 5 and tube 6 are inserted into the plug 3 in the position shown in Figures 2 and 3. With the neck still grasped by the fingers, the balloon may be placed upon the surface of the water and the finger grip then released. The weight of the plug 3 and the other parts at that end of the balloon, will cause the same to assume a tilted position, as shown in Figure 1, with the open end of the tube 6 beneath the surface of water, the result being that as the air is discharged through said pipe 6, the balloon will be propelled along the water in a manner readily understood. I have shown in Figure 1 two balloons in action, the one in the foreground being practically fully inflated, while the other one is shown after it has become partly deflated.

In Figures 4, 5, 6 and 7, I have shown a modified construction of plug, the same being provided with an automatically closing valve that is opened by the insertion of the tube and its parts. Thus, the plug 8 is provided with a groove 9 in its exterior surface adapted detachably to receive and retain the rolled edge 10 of the balloon neck 2, which may or may not be cemented thereto as desired. Said plug 8, which may be formed of semi-vulcanized rubber or other suitable material, is provided with a comparatively large central aperture 11 shouldered at 12 and formed conical within said shoulder at 13, to form a seat for the conical portion 14 of a valve formed of semi-vulcanized rubber, or other suitable material. As shown in Figures 5, 6 and 7, said valve is shaped at its outer end into two projections 15, which leaves a space therearound for the escape of air when said valve has been forced back slightly to the right, as shown by the arrows in Figure 6. In operation, with the sleeve 5 and tube 6 removed, the balloon may be inflated by forcing air thereinto, the valve therein unseating inward against the air pressure, but seating automatically the moment said pressure is removed, so that the necessity for gripping the neck of the balloon after its inflation, and before the insertion of the sleeve 5, is obviated. With the balloon inflated, when it is desired to operate the same, the sleeve 5 with its tube 6 may be inserted into the opening 11 in the plug 8, the inner end of said sleeve automatically forcing the valve to the open position shown in Figure 6, thereby permitting the escape of air and the consequent propulsion of the balloon as it rests upon the surface of the water.

In Figures 8, 9 and 12, I have illustrated still another modification of my improved construction, the same consisting in providing a ballonette 16, within the body of the balloon 1, the same being for the purpose of preventing the balloon from sinking when completely deflated. As shown is detail in Figure 12, the neck 17 of the ballonette 16 is cemented in a neck 18 formed at the end of said balloon 1 opposite to its discharge end, and within said neck 17 of the ballonette 16 is disposed a collar 19 adapted to receive a plug valve 20 which may be formed of wood or other suitable material. The other end of the balloon 1 is provided with the discharge tube 6 and its parts as hereinbefore described. In the operation of this modification, the ballonette 16 is first inflated, by removing the plug 20 and forcing air thereinto, and said plug 20 then is replaced, which will retain said ballonette permanently inflated. By now operating the balloon 1 in the manner hereinbefore described, the same may be inflated and operated as shown in Figure 8, and when it has completely deflated, as shown in Figure 9, it will be supported upon the surface of the water by the buoyancy of the ballonette 16.

In Figures 10 and 11, I have shown still another modified form of valve, the semi-vulcanized plug 21 being extended into a hollow projection 22 slitted at 23, whereby it will open inwardly upon air being forced therethrough. In this manner the balloon may be inflated and said slitted valve will be closed automatically by the pressure of air within the balloon. But when it is desired to operate the device, the insertion of the sleeve 5 within said plug 21 will force the lips of the valve 22 to the open position shown in Figure 11, thereby permitting free escape of the air through the discharge pipe 6.

Having thus fully described the invention, what I claim as new and desire to secure by Letters Patent, is:—

1. A toy, comprising an inflatable balloon, a discharge tube disposed in one end thereof and adapted, when said balloon is placed in water, to lie with its discharge end below the water surface, and a rudder fixed to said discharge tube.

2. A toy, comprising an elongated inflatable balloon, a ballonette disposed within said balloon with its neck passing through one end thereof, a plug for closing said ballonette neck, and a discharge pipe disposed in the other end of said balloon.

In testimony whereof I hereunto affix my signature.

RALPH C. FOSTER.